Sept. 15, 1942. R. B. COTTRELL 2,295,557
QUICK WHEEL CHANGE TRUCK
Filed July 8, 1941 3 Sheets-Sheet 1
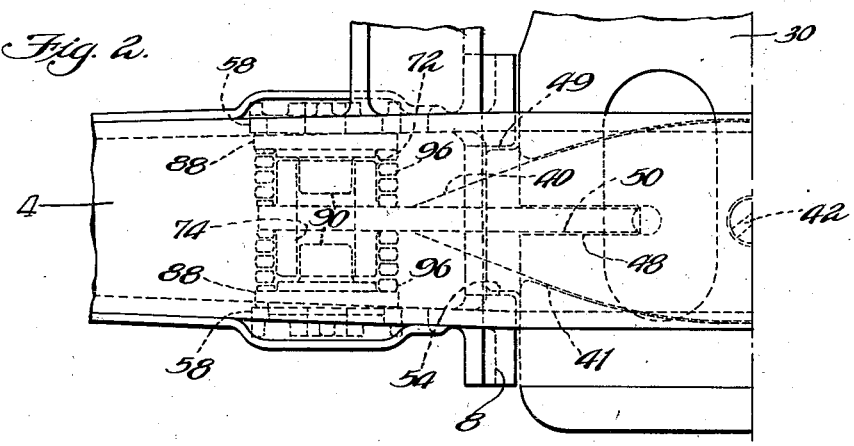
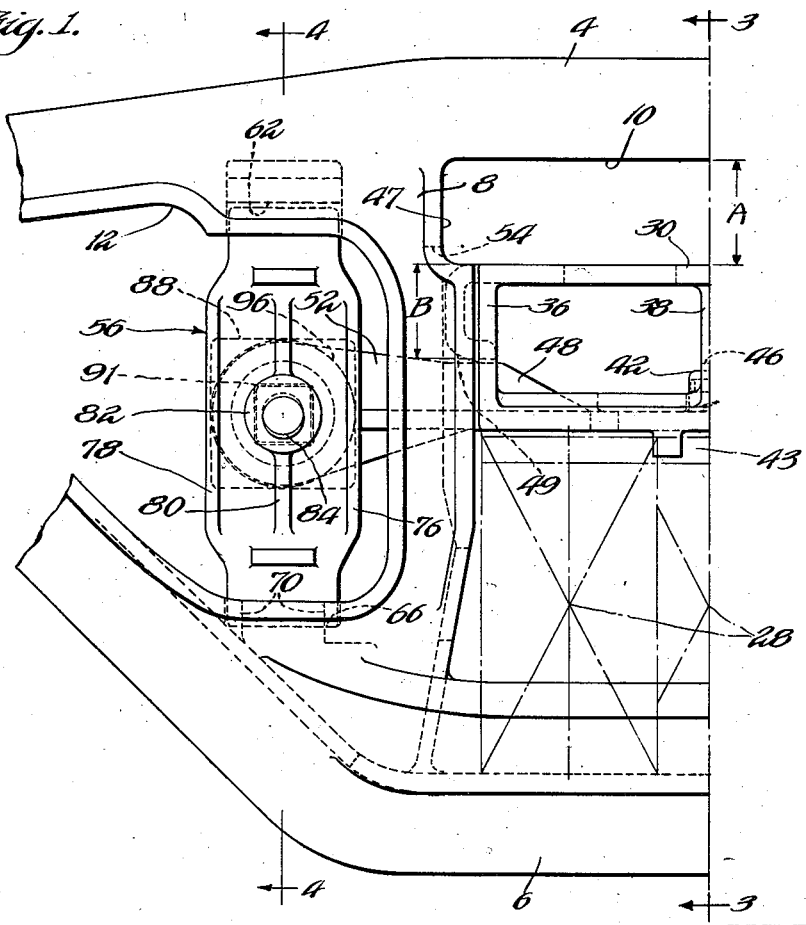
INVENTOR.
Robert B. Cottrell
BY
ATTY.

Sept. 15, 1942.   R. B. COTTRELL   2,295,557
QUICK WHEEL CHANGE TRUCK
Filed July 8, 1941   3 Sheets-Sheet 2
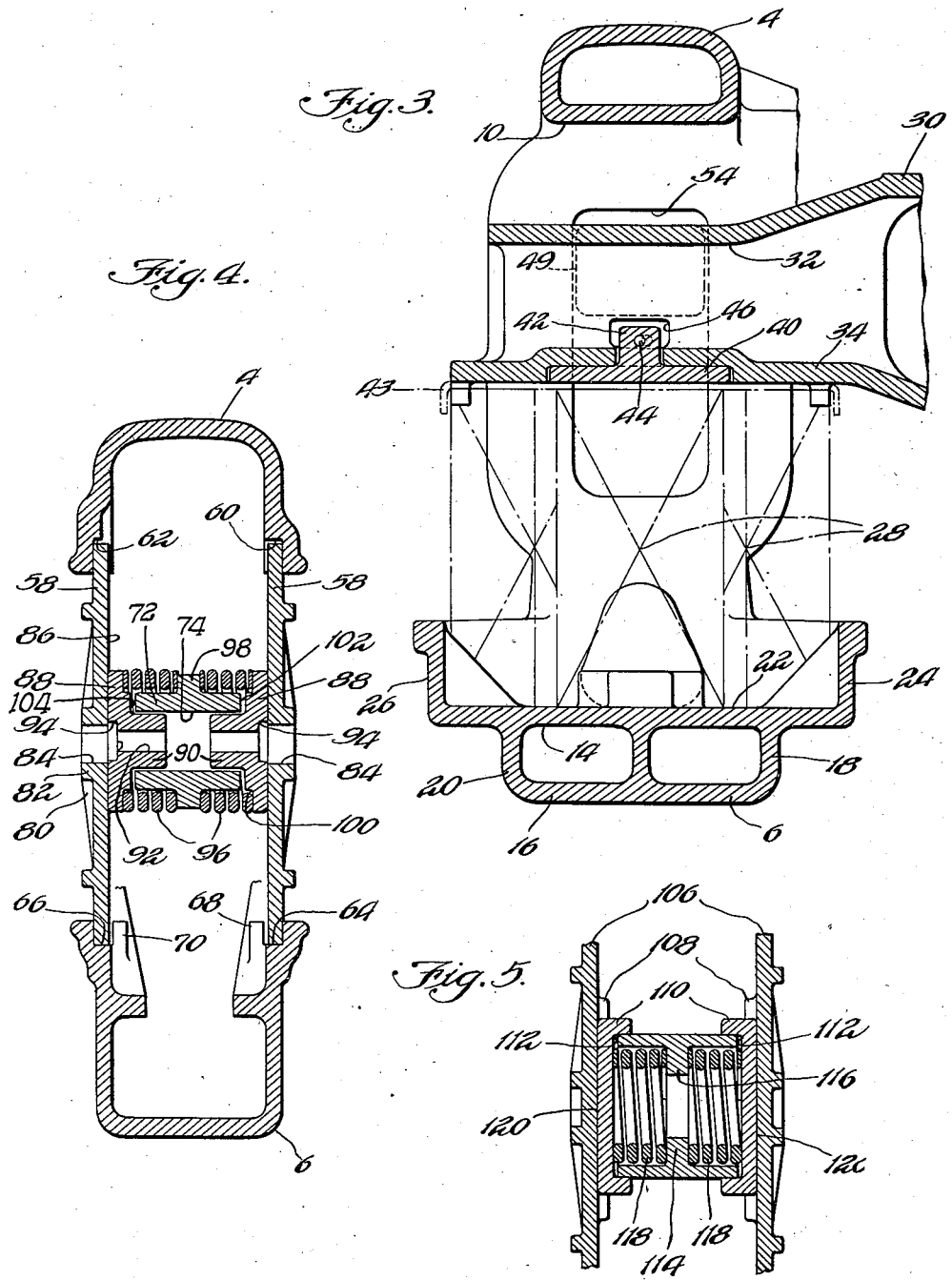
INVENTOR.
Robert B. Cottrell
BY
ATTY.

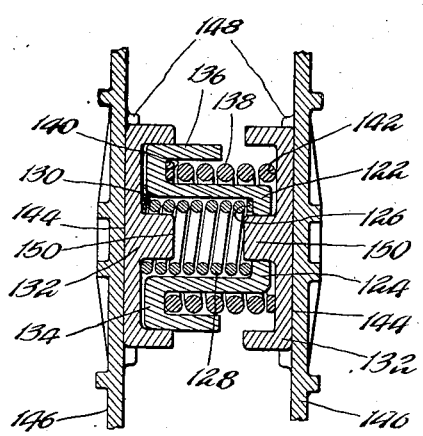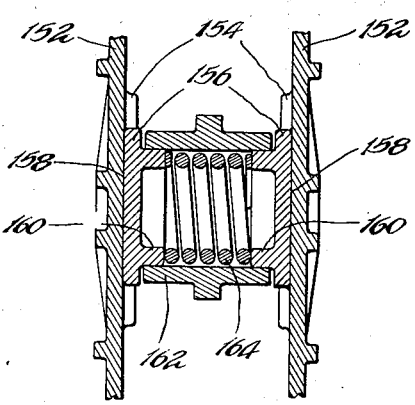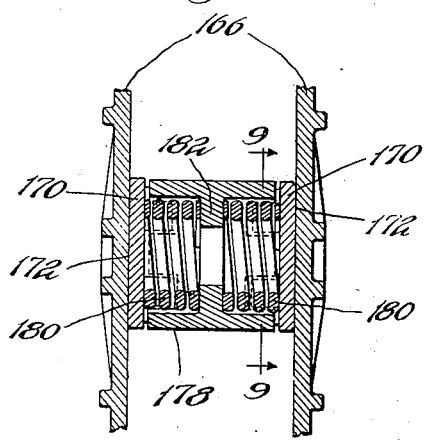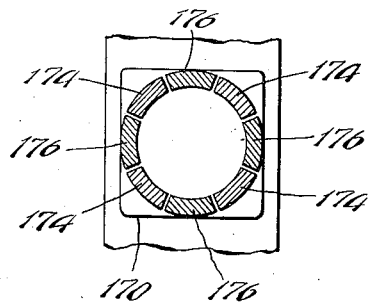

Patented Sept. 15, 1942

2,295,557

UNITED STATES PATENT OFFICE 2,295,557

QUICK WHEEL CHANGE TRUCK

Robert B. Cottrell, Chicago, Ill., assignor to American Steel Foundries, Chicago, Ill., a corporation of New Jersey Application July 8, 1941, Serial No. 401,446

23 Claims. (Cl. 105—197)

My invention relates to a railway car truck and particularly to a four wheel truck of quick wheel change type wherein special snubbing or damping means is associated with the interlocking arrangement between the side frame and bolster. My present application is an improvement on the general form of car truck shown in my co-pending application Serial No. 371,097, filed in the United States Patent Office on December 21, 1940.

The general object of my invention is to devise a novel form of connection between the side frame and bolster of a four wheel railway car truck which will facilitate assembly of the parts or dismantling thereof and will also incorporate a novel form of control unit acting as means for damping the vibrations of coil springs which normally serve as the supporting means for the bolster from the side frame.

In my above referred to co-pending application I have set forth a novel ride control device utilizing friction panels supported in the window openings at opposite sides of the bolster opening with friction shoes actuated thereagainst by means of arms projecting through the columns from a bolster and side frame interlocking member. In the present application a similar arrangement is shown except that the form of the friction absorbing device is modified somewhat to adapt the device for varying operating conditions.

Another object of the present invention is to utilize in the ride control device associated with this novel form of car truck relatively soft springs, that is to say, springs which may have considerable travel with very little change in pressure. Such a spring is desirable in a structure of this character in order to maintain relatively constant friction between the friction shoes and the friction panels against which they may seat.

My invention also incorporates certain other novel features of detail which may facilitate manufacturing and permit maximum ease of assembly and dismantling operations.

My present invention contemplates a novel form of connection between the arm of the interlocking member which actuates the ride control device and the friction shoes which form a part of said device.

Figure 1 is a fragmentary side elevation of a car truck incorporating my invention.

Figure 2 is a fragmentary top plan view of the truck structure shown in Figure 1.

Figure 3 is a fragmentary sectional view through the truck structure shown in Figures 1 and 2, the section being taken substantially in the transverse vertical plane bisecting the truck as indicated by the line 3—3 of Figure 1.

Figure 4 is a further sectional view taken in a transverse vertical plane bisecting the ride control device, the section being taken in the vertical plane indicated by the line 4—4 of Figure 1.

Figures 5, 6, 7, and 8 are fragmentary sectional views corresponding in general to the views of Figure 4, showing alternate constructions or modified forms thereof.

Figure 9 is a sectional view through the alternate structure shown in Figure 8, the section being taken in a vertical plane longitudinally of the truck and substantially as indicated by the line 9—9 of Figure 8.

Describing in detail, my novel car truck may comprise a truss side frame having a compression member 4, a tension member 6 and the integral column 8 merging therewith to form the central bolster opening 10 and the spaced window opening 12 outwardly thereof. Beneath the bolster opening the tension member may have a box section with the top chord 14, the bottom chord 16, the inboard wall 18 and the outboard wall 20, said top chord 14 being widened to form the spring seat 22 and reinforced by the lateral upstanding flanges inboard and outboard thereof as indicated at 24 and 26 respectively, said flanges serving as retaining means for the springs superposed on the seat 22, said springs being diagrammatically indicated at 28, 28. Projecting into the bolster opening 10 may be the end of the bolster generally designated 30, said end having a general box section with the top wall 32, the bottom wall 34, the side wall 36 and the central vertical rib 38 extending longitudinally of the bolster end. The bottom wall 34 may be transversely recessed to receive the horizontal web portion 40 of the interlocking member or control arm 40, and said horizontal web portion may have arcuate edges, the recess in the bottom of said bolster being complementary thereto as may be seen at 41 in the top plan view of Figure 2. The bottom of the interlocking member 40 and the bottom of the bolster end are flush with each other and thus afford a flat seat that may rest on the top spring plate 43 which serves as retaining means for the supporting springs 28, 28 therebelow.

The said interlocking member 40 may have a central lug 42 extending through the bottom wall 34 and formed at its upper end with an opening 44 for reception of means such as the cotter key (not shown) for tying said interlocking member to said bolster. The central rib 38 of the bolster is conveniently cored away as at 46 to accommodate the lug 42. The interlocking member 40 is formed at each end with a vertical rib 48 which is conveniently recessed in the transverse slot 50 (Figure 1) formed in the bottom wall and the side wall of the bolster for that purpose and the vertical rib 48 is continued into the end portion 52 formed at each extremity of the interlocking member to serve as actuating means for the associated ride control device.

The bolster opening 10 has a relatively shallow top portion of greater width than the remainder of said bolster opening, the upper end of each column being offset outwardly as at 47 in order to form said widened portion. The depth of said widened portion is indicated at A (Figure 1) and is somewhat greater than the depth of the guide pad 49 on the side wall of the bolster, said guide pad having a rectangular form as best seen from the sectional view of Figure 3 and being conveniently accommodated in the central opening 54 formed in the adjacent column 8. The depth of the guide pad 49 as indicated at B is somewhat less than the clearance at A, thus permitting the application or removal of the bolster end through the window opening 10 without disturbing the spring arrangement or the interlocking member.

The rectangular column opening 54 (Figure 3) may accommodate the adjacent arm or end portion 52 of the interlocking member 40 which extends therethrough. Outwardly of each column 8 may be mounted the ride control device generally designated 56, said device comprising inboard and outboard friction panels 58, 58, the upper ends of which may be recessed as at 60 and 62 in the lower edges of the inboard and outboard webs of the compression member 4 and the lower ends of which may be similarly positioned on ledges formed at 64 and 66 on the inboard and outboard webs of the tension member 6. Retaining lugs for the lower ends of said panels may be formed on said inboard and outboard web as at 68 and 70.

At the extremity of each end portion 52 of the interlocking member 40 may be formed an integral member 72 generally cylindrical in shape, said cylindrical member being arranged transversely of the truck and having a hollow central opening 74 of rectangular form for a purpose hereafter described. Each friction panel 58 may be a generally rectangular structure on the outer face of which may be formed lateral vertical reinforcing flanges 76 and 78 (Figure 1) as well as a central vertical flange 80 merging centrally of said panel with the circular lug 82 which may be formed with a central opening 84 aligned with a similar opening 84 in the panel at the inboard side of the frame. The inboard face of each panel may be formed as a flat friction surface 86 (Figure 4) for engagement with the adjacent friction shoe 88, the friction face of which may seat against the friction surface of the adjacent friction panel for slidable engagement therewith. Each friction shoe 88 may have a rectangular central stud 90 fitted within the adjacent end of the before-mentioned transverse rectangular opening 74 in the cylindrical member 72 formed at the extremity of the control bar 40. The character of this fit may best be seen at 91 in the side elevation of Figure 1. The interengagement of the lugs 90, 90 on the respective friction shoes 88, 88 thus position said friction shoes with respect to the control bar and prevent the rotation of said shoes, thus maintaining them in normal position against the friction panels. Each friction shoe 88 is formed with a transverse opening 92 extending through the lug 90 and enlarged as at 94 at the friction surface of the shoe to accommodate the head of a retaining bolt which may extend through adjacent friction shoes and be secured by a threaded nut, thus retaining the friction shoes in assembled relation with the compression springs 96, 96 on the end of the control member for convenient assembly within the friction panels. After such assembly such a retaining bolt (not shown) may be removed, permitting the compression springs 96, 96 to expand and urge the friction shoes 88, 88 into normal engagement with the friction panels 58, 58 as shown in the sectional view of Figure 4. It may be noted that the cylindrical member 72 at the extremity of the control bar is formed with a vertical annular flange 98 (Figure 4) which is a continuation of the vertical rib 48 reinforcing the end portion of the control bar, said annular flange 98 serving as seating means for the inner ends of the compression springs 96, 96 the outer ends of which may be positioned as at 100, 100 by annular shoulders formed on the friction shoes 88, 88.

Inasmuch as the control bar 40 is fixed against lateral motion with respect to the bolster and moves therewith laterally as well as vertically, the lateral play between the bolster and the side frame will be limited by the clearance afforded at 102 and 104 (Figure 4) between the inboard and outboard faces of the cylindrical end portion 72 on the control bar and the adjacent inner faces of the friction shoes 88. At the same time, such relative lateral motion between the bolster and the side frame will be somewhat restrained by the compression springs 96, 96. The said springs 96, 96 are designed to afford substantially constant pressure against the friction shoes 88, 88 so that regardless of the small amount of lateral motion permitted, the said springs will bear against the friction shoes with substantially constant pressure, thus developing a relatively constant friction between said shoes and the adjacent friction panels 58, 58.

In the modified arrangement shown in Figure 5, each friction panel 106 may be generally similar to the friction panels described in the previous modification except that they are formed at each edge with the lateral flanges 108, 108 which serve as guides for the friction shoes 110, 110 which may be positioned therebetween, said flanges thus serving as vertical guides for the friction shoes. Each friction shoe may be formed with a circular recess 112 on its inner face for reception of the adjacent end of the cylindrical end portion 114 of the control bar, said cylindrical end portion being formed with an internal annular flange 116 whose opposite faces afford seats for adjacent ends of the compression springs 118, 118, the opposite ends of said springs being seated within the recesses 112, 112 of the friction shoes at opposite sides of the device. The friction shoes 110, 110 may bear against the friction panels 106, 106 as at 120 along flat friction surfaces similar to those described for the previos modification.

In the modification of Figure 6 the end of the control bar is formed with concentric cylindrical portions, the inner and smaller of which, designated 122, is flanged over as at 124 to form a seat as at 126 for one end of the inner compression spring 128, the outer end of which seats as at 130 against the friction shoe 132 at one side of the device. The opposite end of the cylindrical portion 122 is formed as a continuous out-turned annular flange 134 which is continuous with an outer cylindrical portion 136, said outer cylindrical portion 136 being concentric with the inner cylindrical portion 122. Between said cylindrical portions may be housed the outer compression spring 138, one end of which may seat as at 140 while the outward end may bear as at 142 against the friction shoe 132 at the opposite side of the device. In this arrangement as in the previous modifications, each friction shoe 132 is formed with a flat friction surface which may bear as at 144 against the adjacent flat friction face of the friction panel 146 and each friction panel may be formed at its lateral edges with vertical flanges 148, 148 which serve to position the rectangular friction shoes therebetween and prevent rotation of said shoes. In this modification each friction shoe 132 is formed with a central stud 150 serving as positioning means for opposite ends of the inner compression spring 128, one of said studs 150 extending through the adjacent end of the cylindrical portion 122.

In the modification of Figure 7 the friction panels 152, 152 are formed with vertical lateral flanges 154, 154 serving as guides for the friction shoes 156, 156 positioned therebetween. Each friction shoe 156 may have flat face frictional engagement as at 158 with the adjacent friction panel 152 and on its inner face may be formed with an annular flange 160 extending within the adjacent end of the hollow cylindrical portion 162 formed on the extremity of the control arm as in the previous modifications. Each annular flange 160 may afford a spring seat for one end of the compression spring 164 which extends therebetween and serves to urge the friction shoe 156, 156 outwardly into engagement with the adjacent panels. In the further modification shown in Figures 8 and 9 each friction panel 166 is generally similar to those previously described. Rectangular friction shoes 170, 170 have flat face frictional engagement as at 172, 172 with the adjacent friction panels. On the inner face of each friction shoe may be formed a series of arcuate lugs 174, 174 alternately arranged and interlaced with a series of similar lugs 176, 176 formed at the lateral edges of the cylindrical end portion 178 which may be an integral part of the control bar. The lugs 174 and 176 as shown are in substantially circular alignment with each other and serve to house the end portions of the compression springs 180, 180, the outer ends of which may seat against the inner faces of the friction shoes 170, 170 and the inner or adjacent ends of said springs may seat against the annular flange 182 centrally formed on said cylindrical end portion 178.

In each of these modifications such a spring arrangement is afforded as will provide a substantially constant pressure against the friction shoes at opposite sides of the device within the relatively short limits of lateral travel permitted between the side frame and bolster. In each of them also stop means are afforded to limit the relative lateral motion between the side frame and bolster, said stop means consisting of abutting surfaces on the friction shoes and the end portion of the control bar which extends therebetween.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway car truck, a side frame having tension and compression members, and spaced columns forming therewith a bolster opening and spaced window openings, each of said columns having inboard and outboard L-sections spaced to define openings therein aligned longitudinally of said frame, shoulders on each of said L-sections adjacent the upper portions of the columns defining with said compression member a widened portion of said bolster opening of restricted depth, inboard and outboard friction plates mounted in each of said window openings, a bolster extending into said bolster opening and having guide pads on the side walls thereof of less depth than said restricted depth at the top of said window openings and receivable therethrough for positioning between the inboard and outboard portions of said columns, an interlocking member having a central portion associated with said bolster and having arms extending through said aligned openings, friction shoes mounted on said arms in engagement with said friction plates, resilient means under compression between each friction shoe and the adjacent arm, and interengaging means on said arm and said shoes restraining said shoes against rotation.

2. In a railway car truck, a truss side frame having tension and compression members, and spaced columns defining therewith a bolster opening and spaced window openings, inboard and outboard friction plates on said frame adjacent each column, each of said columns comprising inboard and outboard legs defining openings therethrough aligned longitudinally of said frame, shoulders on said legs adjacent the upper portions of said columns defining with said compression member a widened portion of said bolster opening of restricted depth, a spring group seated in said bolster opening, a bolster extending into said bolster opening and seated on said spring group, an interlocking member recessed in the bottom wall of said bolster, said interlocking member having arms extending through said aligned openings, friction shoes supported on the ends of said arms in engagement with said plates, resilient means between each shoe and the adjacent arm, interengaging means on said arms and said shoes restraining said shoes against rotation, and guide pads on the side walls of said bolster of height less than said restricted depth insertable through the upper portion of said bolster opening over said shoulders and receivable between the shoulders on opposite legs of each column for abutment therewith.

3. In a railway car truck, a side frame having tension and compression members, and spaced columns forming therewith a bolster opening and spaced window openings, each of said columns having inboard and outboard L sections spaced to define openings therein aligned longitudinally of said frame, shoulders on each of said L sections adjacent the upper portions of the columns defining with said compression member a widened portion of said bolster opening of restricted depth, inboard and outboard friction plates mounted in each of said window openings, a bolster extending into said bolster opening with guide pads on the side walls thereof of less depth than said restricted depth at the top of said window openings and receivable therethrough for positioning between the inboard and outboard portions of said columns, an interlocking member having a central portion interlocked with said bolster, arms extending through said aligned openings, friction shoes mounted on said arms in engagement with said friction plates, resilient means between each shoe and the adjacent arm, and interengaging means on said arms and said shoes restraining said shoes against rotation.

4. In a railway car truck, a side frame comprising tension and compression members, and spaced columns forming therewith a bolster opening and spaced window openings, said columns having openings therethrough aligned longitudinally of the frame, said bolster opening having a relatively wide upper portion of limited depth defined by shoulders on said columns, a spring group seated in said opening, a bolster extending into said opening and having guide pads on the side walls thereof of vertical depth less than said first-mentioned depth in said window opening and receivable therethrough, said guide pads being normally positioned by the inboard and outboard portions of each column, an interlocking member having a central portion connected to said bolster and end portions projecting through said aligned openings, inboard and outboard friction plates mounted in each of said window openings at opposite sides of each end portion, friction shoes supported on said end portions in engagement with said friction plates, resilient means under compression between each end portion and the associated friction shoes, and interengaging means on said shoes and said end portions restraining said shoes against rotation.

5. In a railway car truck, a side frame comprising tension and compression members, and spaced columns forming therewith a bolster opening and spaced window openings, said columns having openings therethrough aligned longitudinally of the frame, said bolster opening having a relatively wide upper portion of limited depth defined by shoulders on said columns, a spring group seated in said opening, a bolster extending into said opening and having guide pads on the side walls thereof of vertical depth less than said first-mentioned depth in said window opening and receivable therethrough, said guide pads being normally positioned between inboard and outboard portions of each column, an interlocking member having a central portion recessed in the bottom wall of said bolster and end portions projecting through said aligned openings, inboard and outboard friction plates mounted in each of said window openings at opposite sides of each end portion, friction shoes supported on said end portions in engagement with said friction plates, each of said end portions comprising a hollow cylindrical member, an inwardly directed annular flange intermediate the ends of said cylindrical member, and compression springs seated against opposite sides of said flange and in abutment with respective shoes.

6. In a railway car truck, a truss side frame having tension and compression members, and spaced columns defining therewith a bolster opening and spaced window openings, inboard and outboard friction plates on said frame adjacent each column, each of said columns comprising inboard and outboard legs defining openings therethrough aligned longitudinally of said frame, shoulders on said legs adjacent the upper portions of said columns defining with said compression member a widened portion of said bolster opening of restricted depth, a spring group seated in said bolster opening, a bolster extending into said bolster opening and seated on said spring group, an interlocking member associated with said bolster, said interlocking member having arms extending through said aligned openings, friction shoes supported on the ends of said arms in engagement with said plates, resilient members under compression between each arm and the associated friction shoes, and interengaging means on said shoes and said arms maintaining said shoes in normal vertical position.

7. In a railway car truck, a truss type side frame having tension and compression members, and spaced columns forming therewith a bolster opening and spaced window openings, inboard and outboard friction plates fixed on said frame in each of said window openings adjacent said columns, a spring group supported on said tension member in said bolster opening, a bolster projecting into said bolster opening, an interlocking member comprising a central portion recessed in the bottom wall of said bolster, vertical end portions extending through openings in the adjacent columns and between respective friction plates, said bolster and interlocking member being supported on said spring group, each of said vertical end portions supporting a plurality of friction shoes for engagement with the friction plates at opposite sides thereof, resilient means under compression between each end portion and the supported friction shoe, and means on each end portion engaging means on the adjacent shoes to maintain said shoes in normal upright position.

8. In a railway car truck, a truss type side frame having tension and compression members, and spaced columns forming therewith a bolster opening and spaced window openings, inboard and outboard friction plates fixed on said frame in each of said window openings adjacent said columns, a spring group supported on said tension member in said bolster opening, a bolster projecting into said bolster opening, a member having its central portion recessed in the bottom wall of said bolster and seated therewith on said spring group, said recessed member being interlocked with said bolster at spaced points and having end portions extending through openings in the adjacent columns and between said friction plates, friction shoes supported on said end portions in engagement with said friction plates, resilient means under compression between each of said end portions and the supported friction shoes, and interengaging means on each end portion and the adjacent shoes maintaining said shoes in normal upright position.

9. In a railway car truck, a truss side frame having tension and compression members, and spaced columns defining therewith a bolster opening and spaced window openings, inboard and outboard friction plates on said frame adjacent each column, each of said columns comprising inboard and outboard legs defining openings therethrough aligned longitudinally of said frame, shoulders on said legs adjacent the upper portions of said columns defining with said compression member a widened portion of said bolster opening of restricted depth, a spring group seated in said bolster opening, a bolster extending into said bolster opening and seated on said spring group, an interlocking member recessed in the bottom wall of said bolster and interlocked therewith at a plurality of spaced points, said interlocking member having arms extending through said aligned openings, friction shoes supported on the ends of said arms in engagement with said plates, each of said arms having a cylindrical end portion with a central opening, positioning means in said opening, compression springs received within said opening at opposite sides thereof and seated against said means, each of said springs urging the associated shoe into tight engagement with the associated plate.

10. In a railway car truck, a side frame comprising spaced columns partly defining a bolster opening and windows at opposite sides thereof, aligned openings through said columns, resilient means on said frame in said opening, a bolster end received within said bolster opening and supported by said means, a member engaged with said end and comprising arms extending through the openings in said columns, an end portion on each arm and comprising an opening therethrough, friction plates supported from said frame at opposite sides of each end portion, friction shoes supported from each end portion in engagement with respective plates, and coil springs housed in said last-mentioned opening and projecting from opposite ends thereof, each of said springs being under compression between said end portion and the associated shoe.

11. In a railway car truck, a side frame comprising spaced columns partly defining a bolster opening and windows at opposite sides thereof, aligned openings through said columns, resilient means on said frame in said opening, a bolster end received within said bolster opening and supported by said means, a member engaged with said end and comprising arms extending through the openings in said columns, an end portion on each arm and comprising an opening therethrough, friction plates supported from said frame at opposite sides of each end portion, friction shoes supported from each end portion in engagement with respective plates, and coil springs supported by said portion at opposite sides thereof, each of said springs being under compression between said portion and the associated shoe.

12. In a railway car truck, a side frame comprising a bolster opening and windows at opposite sides thereof, aligned openings through said columns, resilient means on said frame in said bolster opening, a bolster end received within said bolster opening and supported by said means, a member engaged with said end and comprising arms extending through the openings in said columns, a cylindrical end portion on each arm and comprising an annular flange, friction plates supported from said frame at opposite sides of each end portion, friction shoes supported from said portion in engagement with respective plates, and coil springs supported by said portion and seated against opposite sides of the flange thereon, each of said springs being under compression between said flange and the associated shoe.

13. In a railway car truck, a truss type side frame having tension and compression members, and spaced columns forming therewith a bolster opening and spaced window openings, inboard and outboard friction plates fixed on said frame in each of said window openings adjacent said columns, a spring group supported on said tension member in said bolster opening, a bolster projecting into said bolster opening, a member having its central portion recessed in the bottom wall of said bolster and seated therewith on said spring group, said recessed member being interlocked with said bolster at spaced points and having end portions extending through aligned openings in the adjacent columns and between said friction plates, friction shoes resiliently mounted on said end portions in engagement with said plates, each of said end portions having at its extremity a transversely arranged cylindrical member and compression springs positioned by said cylindrical member against the adjacent shoes.

14. In a railway car truck, a side frame having tension and compression members and spaced columns defining a bolster opening and spaced window openings, said columns having central openings aligned longitudinally of the frame, a plurality of friction panels in each of said openings outwardly of the adjacent column, a bolster extending into said bolster opening, an interlocking member connected to said bolster and having arms extending into said aligned openings, friction shoes mounted on said arms in engagement with said panels, each of said arms having an end portion with a transverse opening and compression springs in said end portion urging said shoes against said panels.

15. In a railway car truck, a side frame comprising a bolster opening, resilient means on said frame in said opening, a bolster end in said opening and supported by said means, spaced friction panels supported from said frame, a friction shoe in engagement with each panel, an actuator associated with said end and extending between said shoes, alternately arranged interlacing lugs on each shoe and the associated side of said actuator, and resilient means supported from said actuator and urging said shoes into engagement with the associated panels.

16. In a railway car truck, a side frame comprising a bolster opening, resilient means on said frame in said opening, a bolster end supported on said means, spaced friction panels supported from said frame, friction shoes in engagement with respective panels, an actuator engaged with said end and extending between said shoes, alternately disposed circularly arranged interlacing lugs on each shoe and said actuator, and resilient means supported from said actuator and urging said shoes into engagement with the associated panels.

17. In a railway car truck, a side frame having tension and compression members and spaced columns defining a bolster opening and spaced window openings, said columns having central openings aligned longitudinally of the frame, a plurality of friction panels in each of said window openings outwardly of the adjacent column, a bolster extending into said bolster opening, an interlocking member connected to said bolster and having arms extending through said aligned openings, friction shoes mounted on said arms in engagement with said panels, each of said arms having an end portion positioning a plurality of compression springs between the adjacent shoes.

18. In a railway car truck, a side frame comprising a bolster opening, resilient means on said frame in said opening, a bolster end supported on said means, spaced friction panels supported from said frame, friction shoes in engagement with respective panels, an actuator engaged with said end and extending between said shoes, alternately arranged interengaging means on each shoe and the associated side of said actuator, and resilient means supported from said actuator and urging said shoes into engagement with the associated panels.

19. In a railway car truck, a side frame comprising spaced columns partly defining a bolster opening, resilient means on said frame in said opening, a bolster end supported on said means, spaced friction panels supported from said frame, friction shoes in engagement with respective panels, a resilient member engaged with each shoe, actuating means engaged with said end and connected between said resilient members, and interengaging means on each shoe and said actuating means.

20. In a railway car truck, a side frame comprising spaced columns partly defining a bolster opening, resilient means on said frame in said opening, a bolster end supported on said means, spaced inboard and outboard friction panels supported from said frame, friction shoes in engagement with respective panels, a resilient member engaged with each shoe, actuating means engaged with said end and connected between said resilient members, and interengaging means on said shoes and said actuating means.

21. In a railway car truck, a side frame comprising spaced columns partly defining a bolster opening, resilient means on said fame in said opening, spaced friction plates supported from said frame adjacent each column, a friction shoe engaged with each plate, a resilient member engaged with each shoe, a bolster end in said opening and supported on said resilient means, and actuating means engaged with said end, extending between said shoes, and connected to and housing said resilient members.

22. In a railway car truck, a side frame comprising spaced columns partly defining a bolster opening, spring means on said frame in said opening, inboard and outboard friction plates supported from said frame, a friction shoe engaged with each plate, resilient means engaged with said shoes, a bolster end in said opening and supported on said spring means, and actuating means engaged with said end, extending between said shoes, and connected to and housing said resilient means.

23. In a railway car truck, relatively movable members, a friction device mounted on one of said members with opposed friction surfaces, friction shoes having friction faces abutting said surfaces respectively, resilient means urging said shoes into tight engagement with said surfaces, and an actuator fixed in relation to the other of said members and connected between and housing said resilient means for actuation of said shoes through said means.

ROBERT B. COTTRELL.